United States Patent
MacNeille et al.

(10) Patent No.: US 10,715,631 B2
(45) Date of Patent: Jul. 14, 2020

(54) METHOD AND APPARATUS FOR HANDLING APPLICATION TRIGGERING EVENTS

(71) Applicant: FORD GLOBAL TECHNOLOGIES, LLC, Dearborn, MI (US)

(72) Inventors: Perry Robinson MacNeille, Lathrup Village, MI (US); Yimin Liu, Ann Arbor, MI (US); Oleg Yurievitch Gusikhin, West Bloomfield, MI (US); Joe Phillip Pierucci, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 15/850,994

(22) Filed: Dec. 21, 2017

(65) Prior Publication Data

US 2018/0115629 A1    Apr. 26, 2018

Related U.S. Application Data

(63) Continuation of application No. 14/054,881, filed on Oct. 16, 2013, now Pat. No. 9,854,061.

(51) Int. Cl.
*H04L 29/08* (2006.01)
*H04L 12/801* (2013.01)
*H04L 29/06* (2006.01)

(52) U.S. Cl.
CPC .......... *H04L 67/322* (2013.01); *H04L 67/12* (2013.01); *H04L 67/34* (2013.01); *H04L 47/14* (2013.01); *H04L 65/4076* (2013.01); *H04L 67/125* (2013.01)

(58) Field of Classification Search
CPC ....... H04L 67/322; H04L 67/12; H04L 67/34; H04L 67/125; H04L 47/14; H04L 65/4076; H04W 4/046; H04W 4/70; H04M 1/6091; G07C 5/008; G06Q 20/3224

See application file for complete search history.

(56) References Cited

U.S. PATENT DOCUMENTS

| 7,421,334 B2 | 9/2008 | Dahlgren et al. |
| 8,706,348 B2 | 4/2014 | Beams et al. |
| 9,146,900 B2 | 9/2015 | Wang et al. |
| 9,307,012 B2 * | 4/2016 | Marchwicki ............ H04L 67/12 |

(Continued)

FOREIGN PATENT DOCUMENTS

| CN | 103167604 A | 6/2013 |
| CN | 103188303 A | 7/2013 |

(Continued)

OTHER PUBLICATIONS

Chinese Patent Office, First Office Action for the corresponding Chinese Patent Application No. 201410532579.6, dated Jul. 17, 2018.

*Primary Examiner* — Jungwon Chang
(74) *Attorney, Agent, or Firm* — Michael Spenner; Brooks Kushman P.C.

(57) ABSTRACT

A system comprises a processor configured to subscribe to a broadcast of vehicle-related state changes. The processor is also configured to detect at least one vehicle-related state change in the broadcast that triggers an application launch and launch an application corresponding to the detected vehicle related state change.

20 Claims, 8 Drawing Sheets

(56) References Cited

U.S. PATENT DOCUMENTS

| | | | |
|---|---|---|---|
| 9,558,015 B2 | 1/2017 | Schunder | |
| 9,854,061 B2* | 12/2017 | MacNeille | H04L 67/322 |
| 2005/0132024 A1* | 6/2005 | Habaguchi | G06Q 10/063 |
| | | | 709/219 |
| 2006/0154698 A1 | 7/2006 | Ogura et al. | |
| 2010/0248693 A1 | 9/2010 | Suzuki | |
| 2011/0034128 A1 | 2/2011 | Kirsch | |
| 2012/0046806 A1 | 2/2012 | Yokota et al. | |
| 2012/0046808 A1 | 2/2012 | Furuta | |
| 2012/0164989 A1* | 6/2012 | Xiao | G07C 5/008 |
| | | | 455/414.1 |
| 2013/0137415 A1 | 5/2013 | Takikawa | |
| 2013/0137489 A1* | 5/2013 | Takikawa | H04W 4/046 |
| | | | 455/566 |
| 2013/0151996 A1 | 6/2013 | Nario et al. | |
| 2013/0283199 A1 | 10/2013 | Selig et al. | |
| 2014/0012949 A1 | 1/2014 | Meyers et al. | |
| 2014/0095014 A1 | 4/2014 | Rude et al. | |
| 2014/0187149 A1 | 7/2014 | Lortz et al. | |
| 2014/0277843 A1* | 9/2014 | Langlois | H04M 1/6091 |
| | | | 701/2 |
| 2014/0280580 A1* | 9/2014 | Langlois | H04W 4/70 |
| | | | 709/204 |
| 2015/0150027 A1 | 5/2015 | Karachale et al. | |
| 2018/0032997 A1* | 2/2018 | Gordon | G06Q 20/3224 |

FOREIGN PATENT DOCUMENTS

| | | |
|---|---|---|
| EP | 2523436 A1 | 11/2012 |
| EP | 2523463 A2 | 11/2012 |

\* cited by examiner

METHOD AND APPARATUS FOR HANDLING APPLICATION TRIGGERING EVENTS

CROSS-REFERENCE TO RELATED APPLICATION

This application is a continuation of U.S. application Ser. No. 14/054,881 filed Oct. 16, 2013, issued as U.S. Pat. No. 9,854,061, which application is hereby incorporated by reference in its entirety.

TECHNICAL FIELD

The illustrative embodiments generally relate to a method and apparatus for handling application triggering events.

BACKGROUND

In a vehicle computing system (VCS)/application programming interface (API) framework, service apps may be executed on a mobile device, but controlled by a VCS human machine interface. API software connects the VCS to the mobile device to support the control of apps. Starting either mobile apps or apps on the VCS, in the vehicle network or in the internet cloud using API software may currently be an awkward and highly user initiative process in which the driver first sets the VCS into an auxiliary mode, then to mobile applications, issues a command to list the mobile apps that are available, then selects one of the apps and it begins to run. The operation may be so complex that drivers of the vehicle may never discover its existence; it may cause driver distraction, it may easily fail causing a thing gone wrong and it has to be very intentional.

A lack of system initiative features is also a potential hang-up. For example, an owner may take their vehicle to a dealer for a repair and an original equipment manufacturer (OEM) would like the owner to take a quality survey before they reach their next destination. With the present system the driver might need to have the survey application loaded on their mobile device then be instructed by the dealer to walk through the steps above to start the survey application.

EP2523436 generally relates to a mobile device comprising a content selector for selecting recommended mobile applications from those available to the device based on at least one of: context information; user defined preference; and context events. A first user interface area is included for displaying recommended applications selected by the content selector. A second user interface area is included for displaying applications selected by the user for a given context. The first user interface area may be dynamically updated according to user activity and/or on user request. In one embodiment, the content selector selects mobile applications from mobile applications stored on the device and from mobile applications stored remotely.

SUMMARY

In a first illustrative embodiment, a system comprises a processor configured to subscribe to a broadcast of vehicle-related state changes. The processor is also configured to detect at least one vehicle-related state change in the broadcast that triggers an application launch and launch an application corresponding to the detected vehicle related state change.

In a second illustrative embodiment, a computer-implemented method includes subscribing to a broadcast of vehicle-related state changes. The method also includes detecting at least one vehicle-related state change in the broadcast that triggers an application launch and launching an application corresponding to the detected vehicle related state change.

In a third illustrative embodiment, a computer-readable storage medium stores instructions that, when executed by a processor, cause the processor to perform a method including subscribing to a broadcast of vehicle-related state changes. The method also includes detecting at least one vehicle-related state change in the broadcast that triggers an application launch and launching an application corresponding to the detected vehicle related state change.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
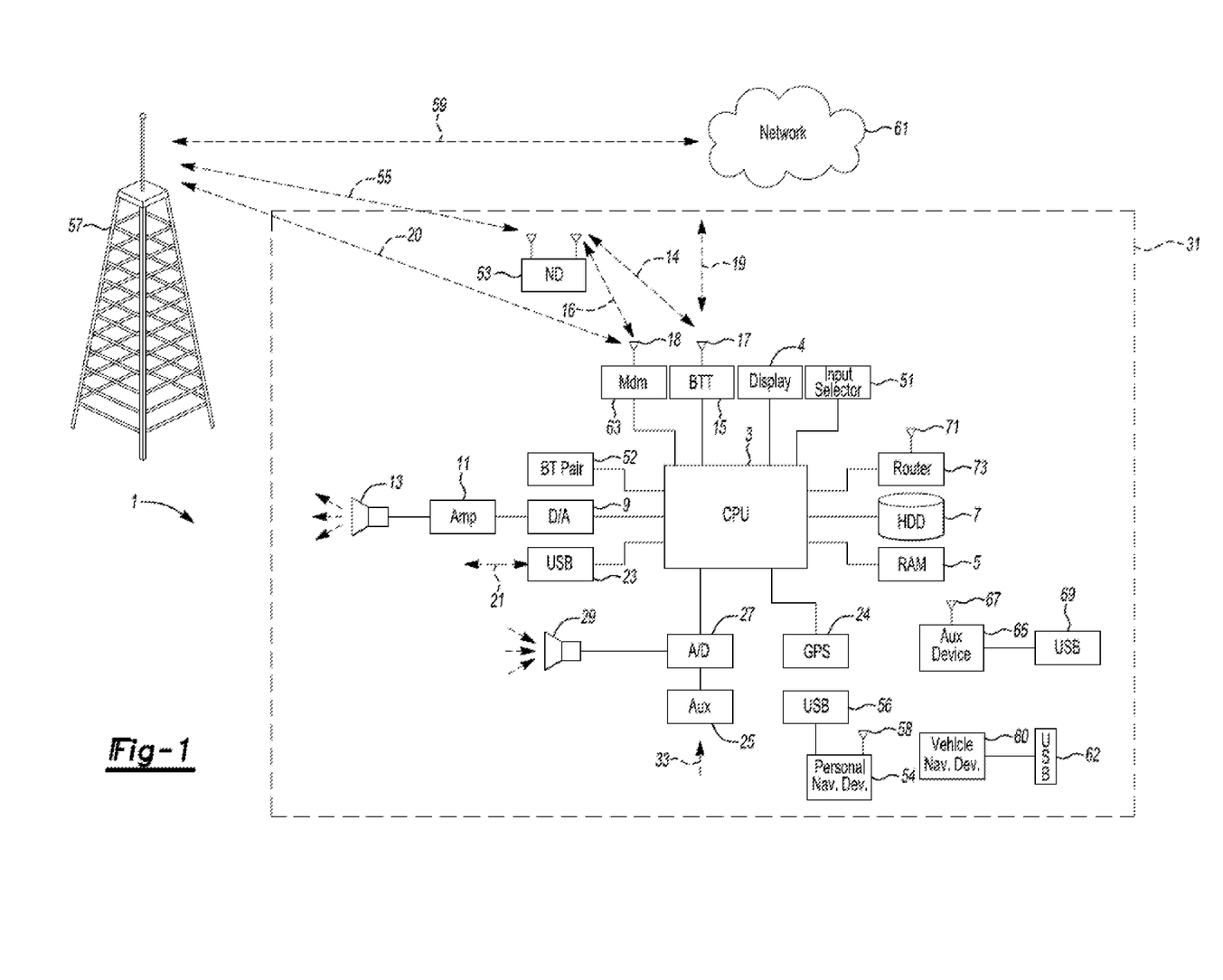
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

There are some other mechanisms for starting an application that should be considered as part of the same problem because only one mobile application can be actively using the SYNC (which is a non-limiting example of a VCS) human machine interface (HMI) at one time, and there may be a need to manage access to the HMI when multiple mobile and other apps are triggered at the same time. Some of these mechanisms include starting a mobile application from a vehicle computer as described above, started by SYNC, started by an application on the mobile device, or started from the Internet cloud/server. Mobile apps on the phone that may be good candidates from triggering AppLink (which is a non-limiting example of an API) mobile apps are the phone application (so the application can be started with a phone call), the SMS application (so an AppLink mobile application can be started with a text message), a voice application (so a AppLink mobile application can be started with spoken commands), an activity (allowing activation from the touch screen), or a context driven application that could trigger starting an application with rules based on context conditions such as a geofence or a weather condition.

Within the AppLink Mobile device framework it could also be possible to trigger an AppLink application when AppLink is disconnected, for example when the driver parks the vehicle and leaves. The mobile application in this case could have similar features, but could use the mobile device HMI instead of the SYNC HMI. With AppLink disconnected (at distances greater than Bluetooth range) triggers from the vehicle computers or from SYNC commands can be difficult to obtain unless the vehicle is powered and connected from the Internet, in which case AppLink apps can be triggered via the internet. For example, a user might return to a car and find a cell phone is lost. The user could turn the car on and run an application on the phone that displays the phone's GPS location on a map in the car. The application even may ask a few marketing questions in return for finding the phone.

When a mobile application is triggered, generally some information may be needed from the Internet, including input data for the application and perhaps the application itself. Wireless Internet connections to moving vehicles tend to be slow and unreliable; requiring resets when the signal is lost or a handoff between servers occurs. The input files may be large, especially if they are media files. So it may be best not to rely on streaming data in real time, instead as much input data as possible can be downloaded into the mobile device file system before the mobile application is run. To reduce wireless bandwidth partially downloaded files can be completed not replaced and obsolete files n be patched if possible not replaced. The process is more like synchronization than it is like file transfer. Triggering an application is potentially a three step process: download application, download input data, run application.

Figure 2A:
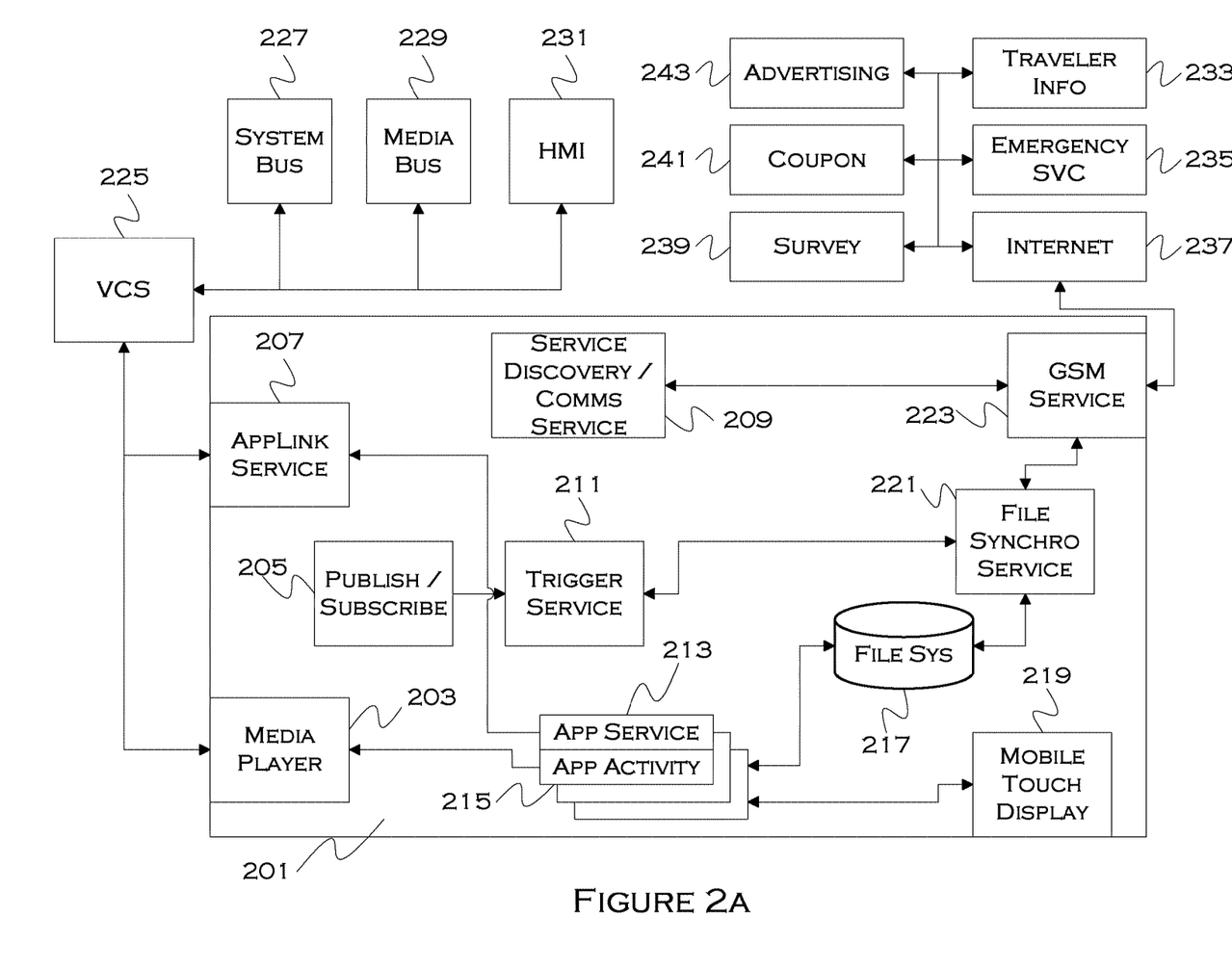
FIG. 2A shows an illustrative example of a mobile application framework.

FIG. 2A shows an illustrative example of an application triggering system. In this illustrative example, a mobile device framework 201 contains a variety of modules that facilitate application activation. Various triggers, which can be automatically initiated (through the occurrence of an event, for example) or initiated by user actions (such as, but not limited to, a request for an application), are received by the mobile device framework. The framework then handles the triggers accordingly, an, if appropriate, launches or activates a corresponding application.

In this illustrative example, an AppLink service 207 establishes, maintains and closes connections to a VCS. The service may be started at boot time, when Bluetooth and USB become active. It may attempt to discover, pair, and connect to authorize VCS modules that are within Bluetooth range or connected to a VCS USB device. The service may send messages to the operating system when the connection is opened or closed.

The framework also includes a GSM service 223. This service establishes and maintains connections to resources on the Internet. The application starts when the GSM (wireless cellular broadband) connection is started at system startup. The service signals the operating system when the connection is made and when it is lost. Registered applications receive the signals and react to them. Applications may operate differently when a connection is lost, but a file synchronization service 221 helps reduce this issue.

If there is no GSM device on the mobile device, the GSM module may use a GSM modem on the VCS, connecting through, for example, Bluetooth, WiFi, USB, etc. If there is no GSM modem available to the mobile device, then mobile AppLink applications may run in a no-GSM mode using data synchronized in other ways, through the file synchronization service.

A web service discovery and communication service 209 may register with service discovery and communication systems on content delivery networks in the Internet cloud. The service can receive route information from a publish/subscribe system 205 to help the Internet discovery systems track movements of the vehicle through a content delivery network.

The publish/subscribe service 205 includes message oriented middleware loosely called a publish/subscribe system. The system starts when the AppLink service starts and connects an application in the framework with vehicle system computers using messages. The service filters messages and applies security policies in both directions, but it also passes messages that an application in the framework or the VCS has requested, this can greatly reduce the amount of communication that is needed.

Subscribed messages may be delivered by a number of mechanisms. For example, in an immediate mode where they are forwarded directly to a subscribing application when they are received, in a queued mode where the messages fill a queue that can be read by a subscriber on demand, etc. Generally there can be many subscribers to a single message, but also there may be only one publisher. This is not always the case, but is fairly common. The publish/subscribe system applies time and publish stamps to messages, providing a uniform time-base for the system. It is also possible for applications on the Internet to subscribe to messages on the publish/subscribe system, but generally with more stringent security policies.

Because transmission rates in wireless Internet to vehicles is quite variable, the strategies for streaming data that were developed for desktops systems may not work as well in a mobile environment. Further, mobile devices have ample data storage. The file synchronization service 221 ensures concurrency between files on the mobile device and files in the cloud, and in this respect is similar to other file synchronization software. There are also some additional challenges for mobile apps, such as synchronizing in a movable vehicle where handoffs between Internet servers is necessary and synchronizing when disconnected from the car in WiFi hotspots, over USB to a desktop computer, USB drives and Bluetooth connections to the Internet.

A media player service 203, streams audio data from the mobile device media player to a VCS over a wireless or wired connection, and then to a vehicle audio system. If a connection to the VCS 225 is unavailable, the media may stream to the mobile device output, either speakers or a mobile device audio out. The mobile device may be muted, in which case there may not be audio output. Mobile applications can detect the type of audio output and adapt.

The mobile device may include a touch display 219 is an activity that interacts with the display to support trigger service features. In at least one embodiment, only one activity can be associated with one display on the mobile device, and most mobile devices only have one display. Therefore, this activity will generally be activated by the user and exclude other activities when it is running.

A trigger service 211 determines when it is the best time to run an application service or file synchronization. First, the service discovers an application that should be played for the driver. Selection of the application is based on a variety of factors, including, but not limited to, availability, user preferences, media providers, application providers, etc. To trigger an application, the service requests the file synchronization to ensure the application code is up to date on the mobile device, then it requests the selected input data to be synchronized to ensure the application has the correct version of any input data. When this is accomplished, the process waits until an appropriate time is found to launch the application.

Appropriate timing can be dictated by a variety of factors. These include, but are not limited to, preset triggers (for example, an oil change reminder), payment/advertisement trigger (vehicle upgrades, lease expiration, for example), geofence triggers, adaptive triggers, work load inhibitors, pragmatic sequencing, politeness inhibitors, availability sequencing, etc. The application can include an application capable of interacting with a person, through a transactional dialogue, for example, through an HMI. The application may adapt to current conditions, such as when the HMI is available, and can communicate with the VCS and vehicle computers, sensors and actuators through the publish/subscribe system. It may also access data from Internet servers and from the file system.

Some non-limiting examples of trigger situations are discussed herein, but these are exemplary situations only and are not intended to limit the scope of the invention. An example of a preset trigger includes a dealer maintenance trigger. For example, when a dealer does maintenance a trigger is set in one of the vehicle computers that goes off when the maintenance should be repeated. For example, when oil is changed the mechanic can set a trigger that causes a notification to the driver at a recommended point for another change. A survey could also be presented based on a preset trigger, for example, when a time or mileage had passed since the maintenance. Drivers can preset triggers as well, for example, to play a news reading application when the driver is alone in the vehicle.

Certain payment due dates may also trigger an application. For example, an automotive due date could trigger a payment reminder. Vehicles approaching the end of a lease, or that have been in service for a while, may have a reminder associated with purchase of a new vehicle presented therein. Geofences may also trigger applications or activation of advertisements, based on, for example, proximity to a location.

Since applications may run in a vehicle environment, or on a portable device, it may be useful to have triggers that can adapt between vehicle and hand-held interactions. Also, triggering events may occur, but, due to workload constraints on the driver (e.g., heavy traffic), the corresponding application launches may be delayed for some time period. Triggers may also be pragmatically sequenced, based on known or guessed event occurrences. For example, passing by a restaurant may trigger an advertisement. Pulling into the restaurant may trigger a menu application. Leaving the restaurant may trigger a survey about the restaurant. But it would not be pragmatic to deliver the survey before the food had even been eaten, so the process would, in this case, ensure the user had entered the restaurant parking lot, waited some reasonable period of time (corresponding to eating food) and then left the lot. This would indicate that food had been purchased and consumed, thus appropriately triggering a survey.

Applications may also be paused for politeness, such as when a conversation is ongoing in the vehicle. Applications may also be availability sequenced. This sequencing downloads at least part of block of required media before launching an application. When sufficient media exists, the application is presented. This is known as availability sequencing.

Applications can include, but are not limited to, digital direct marketing applications (DDM). Such applications can utilize triggers to present advertisements to users at appropriate times, thus increasing the likelihood of response. Other applications are also triggerable, and include almost any application that could be situationally appropriate.

Figure 2B:
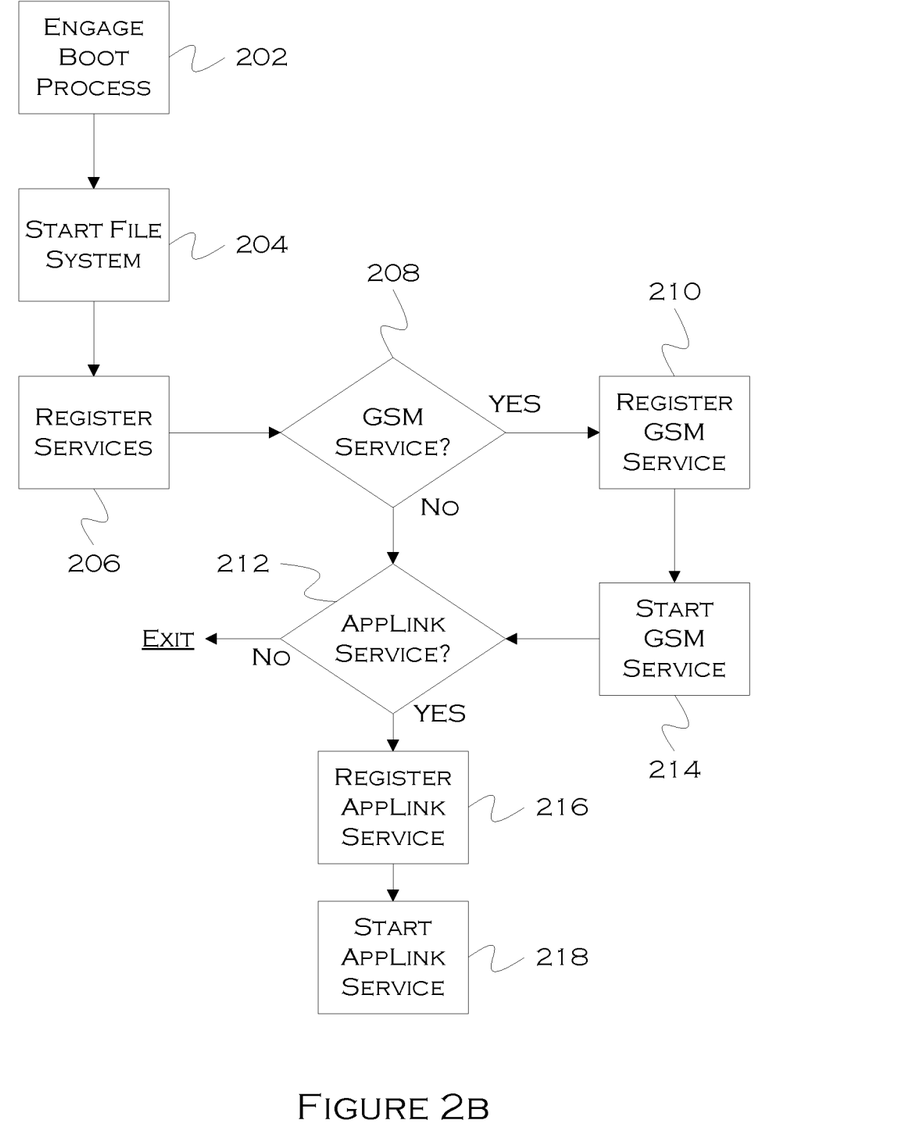
FIG. 2B shows an illustrative example of a service engagement process.

FIG. 2B shows an illustrative example of a service engagement process. In this illustrative example, the process begins a boot procedure 202 that initializes a number of modules. Included in the boot process is an inception of a file system 204. This process registers any number of services used by the mobile application framework 206. This aids in verifying the presence and usability of desired services.

For example, in this embodiment, the process checks to see if a GSM service is available 208. The presence of the GSM service will indicate that the mobile framework will be able to use cellular services if needed. The cloud can provide a number of application services as well, such as, but not limited to, advertising, coupons, surveys, transfer information, emergency services, and Internet services.

If GSM services are available 208, the process registers the GSM service 210. The GSM service is started after the service is registered 214. Also, AppLink services can be detected 212. AppLink services can connect the mobile framework to the vehicle and can include access to, for example, a vehicle BUS (such as a CAN BUS), a media BUS, an HMI, etc. If AppLink services are available, the process can register the AppLink service 216 and start the AppLink service 218

Figure 3:
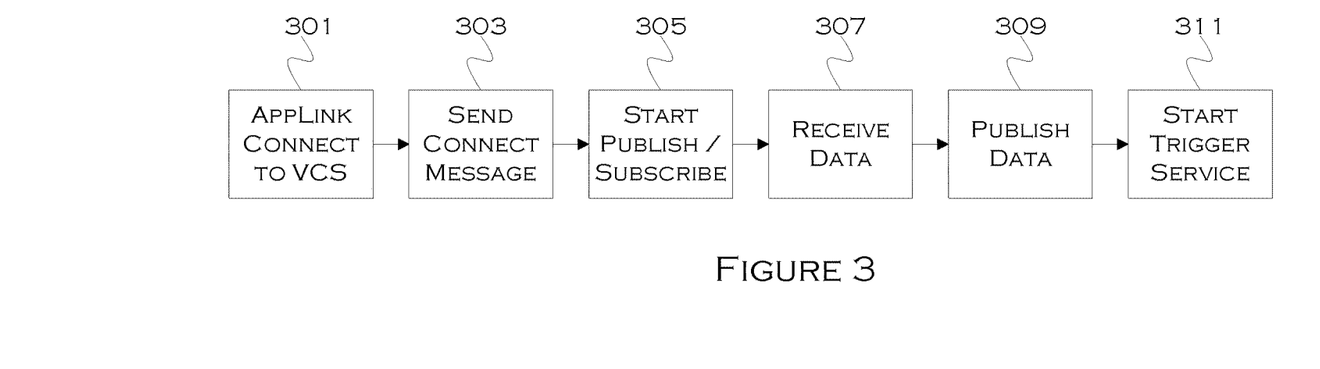
FIG. 3 shows an illustrative example of an applink service connection process.

FIG. 3 shows an illustrative example of an AppLink service connection process. This process will allow the mobile application framework to use the AppLink service to receive triggers from the VCS. The Applink service connects to the VCS 301 and sends a connection message 303 to the operating system.

Once connected, the process registers with the publish/subscribe service. Then, the publish subscribe service can be started 305. The publish/subscribe service allows applications and processes to exchange data. Triggers and other information can be published to the publication portion of the service. Subscribing entities can then receive relevant information published to the service.

For example, a refueling application may only be interested in information published related to a fuel state. If a vehicle fuel system published fuel information to the publishing service, the fuel application may be a subscriber for that information. Other information would be ignored by the refueling application, but information published that relates to a fuel state would be sent to the subscribing refueling application.

The process running the publishing service can receive data from any entity desiring to publish to the publishing service 307. This data can be almost limitless, but generally is data that a different subscribing entity may find useful. The received data can then be published 309. In this example, the process subscribes to the publishing service on behalf of a triggering service 311, so that the triggering service can receive published data that may constitute a triggering event.

Figure 4:
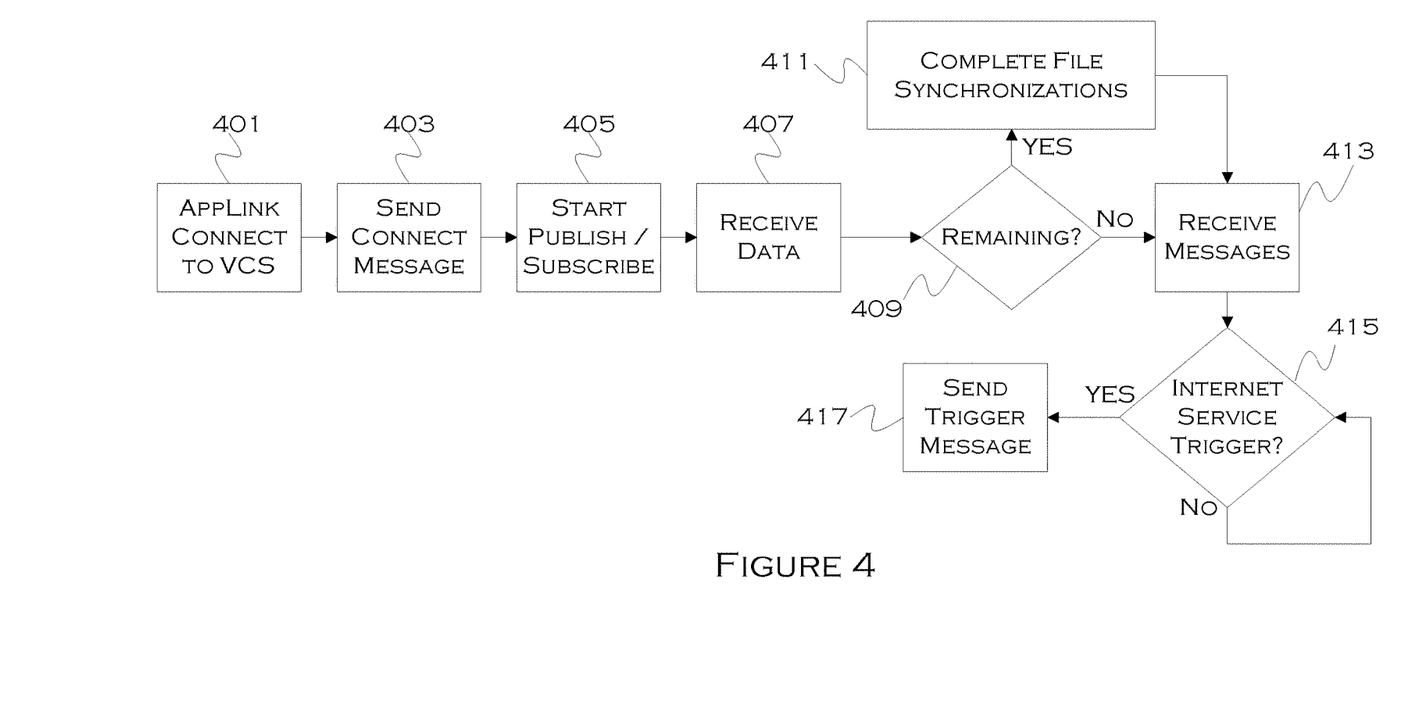
FIG. 4 shows an illustrative example of a GSM service connection process.

FIG. 4 shows an illustrative example of a GSM service connection process. This service provides connectivity and remote services access to the framework. Through the GSM service, files can be synchronized and internet triggering events can be realized. If there is a GSM service, the GSM service connects to the framework and sends a GSM connect message to the operating system (OS) 401. The process can also start a web service discovery 403.

Web service discovery can be used to discover available services for use by the framework. This can include any number of cloud-based services. The process can also use web service discovery to register with internet service discovery systems 405. The process can also begin file synchronization 407.

If there are files to be synchronized, the process can start file synchronization as well 407. As long as there are files remaining to be synchronized, the synchronization process can continue to run 409. Once all necessary files have been synchronized 411, the process can receive messages from the internet services 413. These messages can act as triggers, in a similar manner to the vehicle events. Services may be triggered over the internet, for example, by remote user request. If an internet service trigger exists 415, the process can send a trigger message to the trigger handling module and then the appropriate action can be taken by the framework. The internet service triggers can also be published to the publish/subscription feed if desired.

Figure 5:
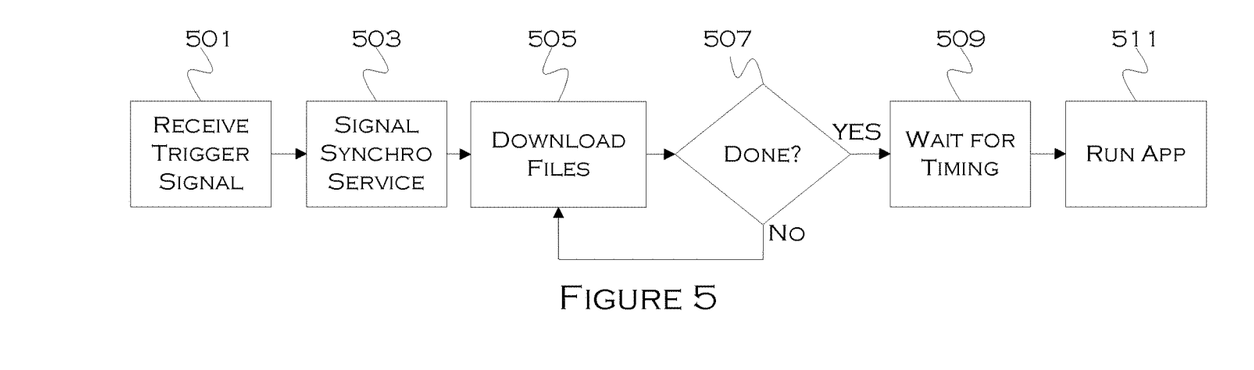
FIG. 5 shows an illustrative example of a triggering process.

FIG. 5 shows an illustrative example of a triggering process. This is one example of how an application can be triggered from a remote source. The process receives a triggering signal 501. This can be a signal received from, for example, a user action in vehicle or a vehicle system bus. Upon receipt of the triggering signal, the process signals a synchronization service 503. This service can help ensure that any requisite media is present on the device.

The synchronization service will download media from a remote server so that a device can run an application even if a remote connection is interrupted or lost. It also provides sufficient media to a device so that an application isn't choppy in a presentation. The amount of media needed on the device can be any amount, and can be varied on a case by case basis. Any files or portions thereof that are needed can be downloaded by the synchronization service 505 until the downloading is completed 507.

Also, triggers may initiate an application, but not always immediately. If the application has a delay associated therewith, or requires a second trigger, for example, the process will wait until 509 the timing is appropriate. Also, if any suppression events are currently present (e.g., driver conversation or high workload), the process may wait until an appropriate time. Then the application can be run 511.

Figure 6:
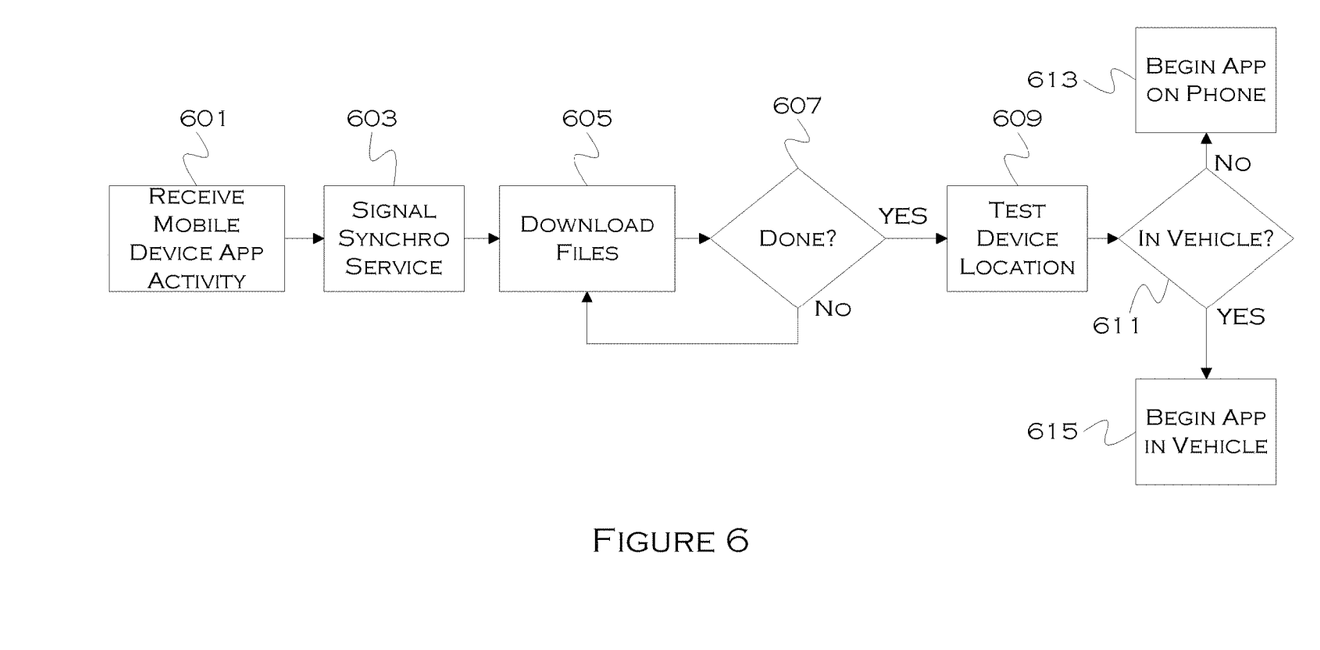
FIG. 6 shows an illustrative example of another triggering process.

FIG. 6 shows an illustrative example of another triggering process. In this illustrative example, the process is triggered by mobile device activity, such as, for example, a text message. The process receives the mobile device activity 601 and repeats the synchronization process as discussed above 603, 605.

Since the trigger was received through the mobile device, in this case, it is possible that the device is not even connected to a vehicle at the time the trigger was received. Accordingly, the device will test to see if it is presently located in/connected to a vehicle or not 609. If the device is not in a vehicle 611, the process will launch a triggered application on the device itself 613. Otherwise, the process can launch the device in the vehicle and use the vehicle HMI for device interaction.

Figure 7:
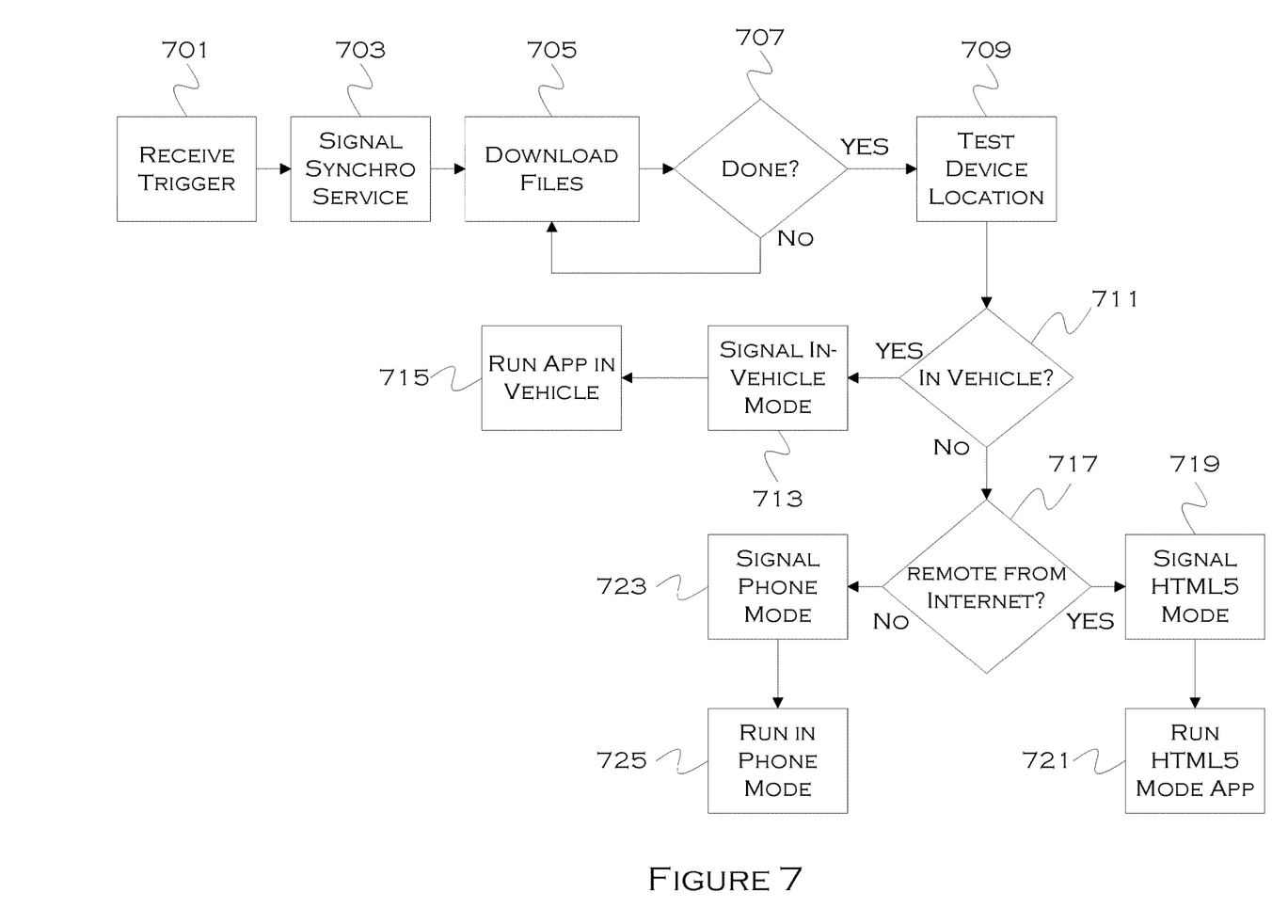
FIG. 7 shows an illustrative example of yet another triggering process.

FIG. 7 shows an illustrative example of yet another triggering process. In this illustrative example, a trigger may be sent by an internet service. This could be useful, for example, if the driver and a mobile device are in different locations. The driver could use the internet to send a signal to the mobile device to activate, for example, a location application that could assist in finding the mobile device.

In this illustrative example, the process receives a trigger from a connection to the internet 701. In order to allow processing of the application, even if the connection is lost, the process then signals a synchronization service 703 and proceeds to download files 705. This download continues until such time as sufficient synchronization is completed 707.

Since different functionality may be enabled based on where the device is located, the process may test the device location to see a current location of the device 709. If the device is in a vehicle 711, the process may signal an in-vehicle mode 713. This can allow interaction with the device through an in-vehicle HMI.

If the device is remote from the Internet 717, the process may signal an HTML5 mode 719. This can cause an application to run on the device, in an HTML5 mode 721 while running. In a third option, the process may signal the application to run in a standard "phone mode," 723, which causes the application to run in a phone mode on the phone 725.

Figure 8:
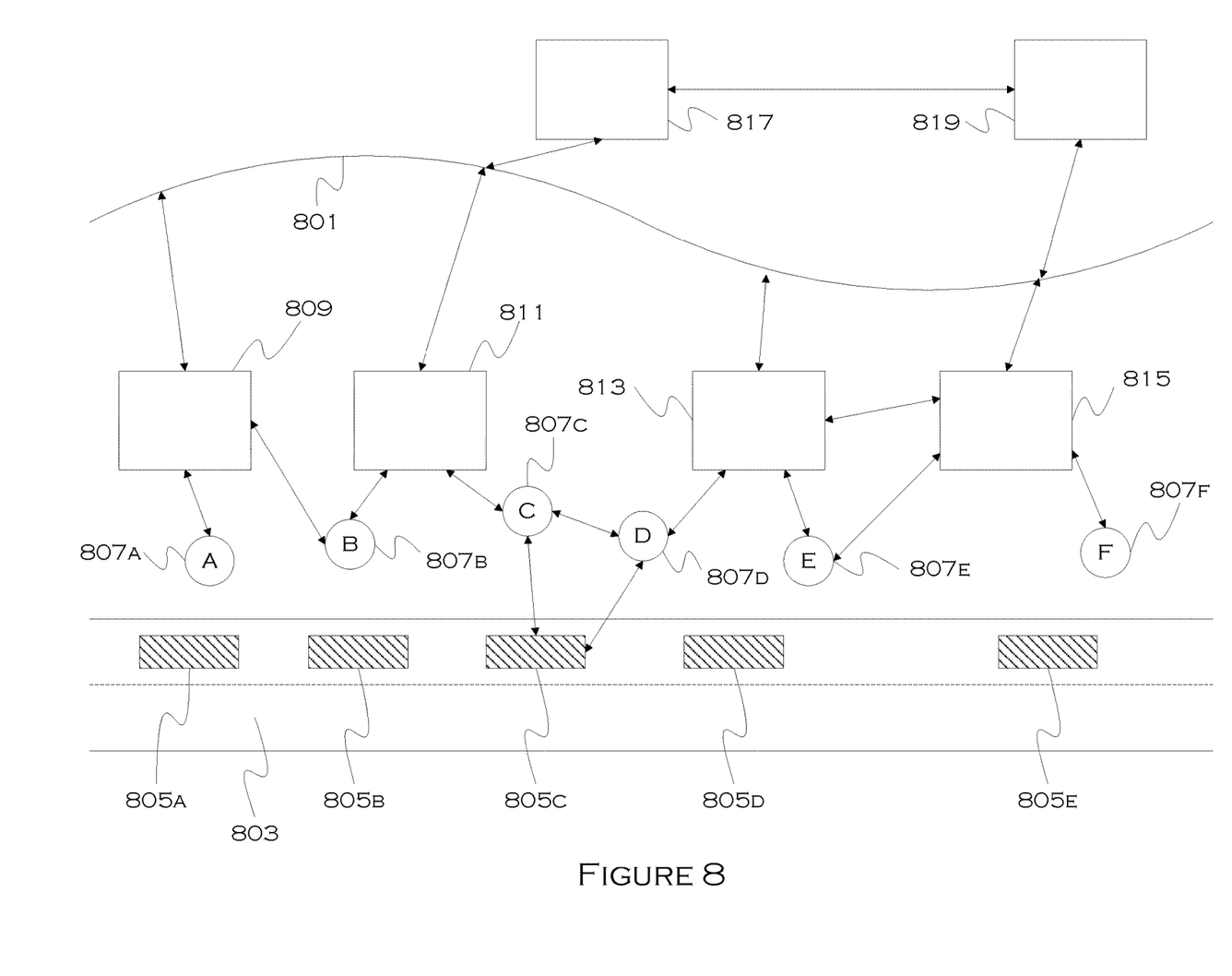
FIG. 8 shows an illustrative example of a server network.

FIG. 8 shows an illustrative example of a server network. In this illustrative example, a plurality of origin servers 817, 819 contain applications that are accessible on a mobile device, which, in this case, is carried within a moving vehicle. The origin servers are in communication with an Internet backbone 801, which itself provides further connection to a series of repetition servers 809, 811, 813, 815.

The application and any associated data can be provided to a repetition server 809 for communication to a cell tower 807A, 807B, which can then communicate with the device in the vehicle 805A, 805B. As the vehicle moves down the road 803, different cell towers, in communication with different repetition servers, are accessed.

Information is passed between the vehicle and repetition servers, and between the repetition servers themselves. When a vehicle is approaching a pass-over point, where control is passed from one repetition server to another, such as the transition from 805B to 805C, the process can connect the vehicle to a new server 813. The new server communicates with the vehicle through a new tower 807D in this case. Since some measure of data has likely already been synchronized, it is unlikely that it is desired to begin synchronization anew, each time control is passed. Accordingly, such as is shown between 813 and 815, the process may pass information from one repetition server to another. The information can include information relating to the completed portions of transfer, and what information still needs to be synchronized. Handling of the synchronization can then be controlled by 815, by picking up where server 813 left off.

Figure 9:
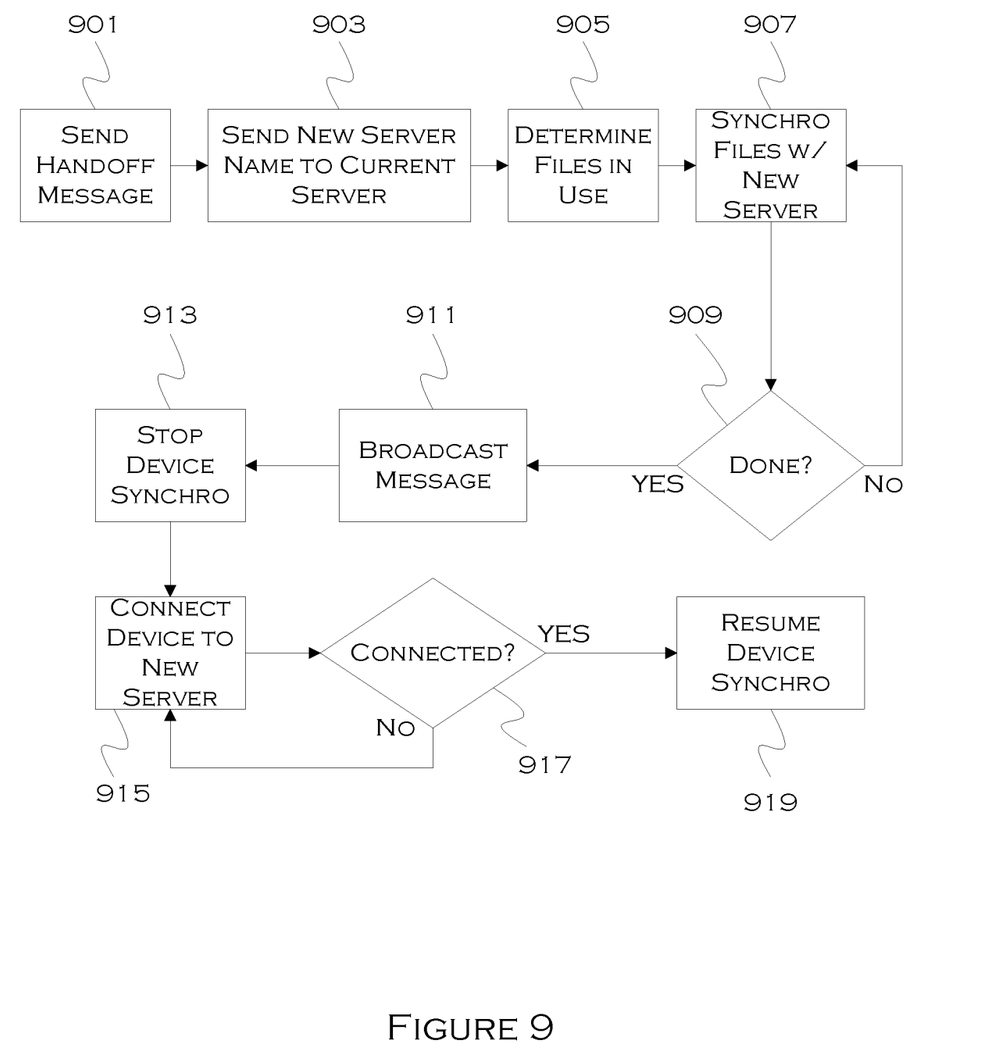
FIG. 9 shows an illustrative file synchronization handoff process.

FIG. 9 shows an illustrative file synchronization handoff process. In this illustrative example, the process sends a handoff message to a new server and to a mobile device engaged in a synchronization process 901. This indicates that a handoff is imminent. Handoffs can occur, for example, as a new cellular tower is approached or when connection with a new tower has been established.

The process also sends a new server name to the current server 903, so the current server knows where to pass the data relating to the synchronization process. Once the new server is identified, the process can determine which files are currently in use, and which files still need to be synchronized 905. These files can then be transferred from the current server to the new server 907, or provided by an origin server. Once the synchronization between servers is completed 909, the process can continue.

A message is then broadcast to the mobile device that a server exchange is going to occur 911. The message also includes an identifier of the new server for handling the synchronization process. Once the message has been broadcast, the process can terminate a current device synchronization, so that the new synchronization can begin 913. The device continues to attempt to connect to the new synchronization server 915 until a connection can be established 917. Once the connection is established 917, the synchronization of files can resume.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a smart-phone processor configured to:
provide access to a publish-subscribe service, wherein data from entities other than the smart-phone can be published to the publish-subscribe service and a triggering service, executing on the smart-phone, can subscribe to the data;
wirelessly receive vehicle data published to the publish-subscribe service;
receive the vehicle data at the triggering service, when the vehicle data corresponds to data to which the triggering service has subscribed;
determine, via the triggering service, an application trigger that indicates that an application should be launched on the basis of the received vehicle data, the application trigger provided to the triggering service when the application was installed and used by the triggering service as a basis to subscribe to data, from the publish-subscribe service, that corresponds to the application trigger; and
launch the application responsive to the trigger.

2. The system of claim 1, wherein the trigger includes a diagnostic code.

3. The system of claim 1, wherein the trigger includes a vehicle financial-related trigger.

4. The system of claim 3, wherein the financial-related trigger includes a lease expiration warning.

5. The system of claim 3, wherein the financial-related trigger includes a vehicle upgrade availability.

6. The system of claim 3, wherein the financial-related trigger includes a payment reminder.

7. The system of claim 1, wherein the trigger includes a geographic trigger.

8. The system of claim 7, wherein the geographic trigger includes crossing a geofence.

9. The system of claim 7, wherein the geographic trigger includes proximity to a business.

10. A computer-implemented method comprising:
receiving, via triggering service executing on a mobile phone, an application trigger from an installed application that indicates that the application should be launched when the triggering service receives data defined by the application trigger;
subscribing to a publish-subscribe service, executing on the mobile phone, the subscribing including a subscription to data published to the publish-subscribe service that also corresponds to the data defined by the application trigger;
receiving vehicle data published to the publish-subscribe service, the receiving based on the subscription requested by the triggering service;
launching an application, via the triggering service and responsive to the received data, based on the application trigger defining data that corresponds to the received data.

11. The method of claim 10, wherein the trigger includes a diagnostic code.

12. The method of claim 10, wherein the trigger includes a vehicle financial-related trigger.

13. The method of claim 12, wherein the financial-related trigger includes a lease expiration warning.

14. The system of claim 12, wherein the financial-related trigger includes a vehicle upgrade availability.

15. The system of claim 12, wherein the financial-related trigger includes a payment reminder.

16. The system of claim 10, wherein the trigger includes a geographic trigger.

17. The system of claim 16, wherein the geographic trigger includes crossing a geofence.

18. The system of claim 16, wherein the geographic trigger includes proximity to a business.

19. A non-transitory computer-readable storage medium, storing instructions that, when executed, cause a mobile phone processor to perform a method comprising:

receiving, via triggering service executing on the mobile phone, an application trigger from an installed application that indicates that the application should be launched when the triggering service receives data defined by the application trigger;

subscribing to a publish-subscribe service, executing on the mobile phone, the subscribing including a subscription to data published to the publish-subscribe service that also corresponds to the data defined by the application trigger;

receiving vehicle data published to the publish-subscribe service, the receiving based on the subscription requested by the triggering service;

launching an application, via the triggering service and responsive to the received data, based on the application trigger defining data that corresponds to the received data.

20. The storage medium of claim 19, wherein the trigger includes at least one of a diagnostic code, a vehicle financial-related trigger, or a geographic trigger.

* * * * *